united States Patent Office 3,803,092
Patented Apr. 9, 1974

3,803,092
PROCESS TO MAKE DIELS-ALDER MODIFIED OLEFIN TERPOLYMERS AND PRODUCTS THEREFROM
Sebastiano Cesca, San Donato Milanese, and Sergio Arrighetti, Milan, and Arnaldo Roggero and Giuseppe Ghetti, San Donato Milanese, Italy, assignors to Snam Progetti S.p.A., Milan, Italy
No Drawing. Filed Apr. 16, 1971, Ser. No. 134,822
Claims priority, application Italy, Apr. 16, 1970, 23,389/70; Sept. 3, 1970, 29,294/70
Int. Cl. C08f 27/00, 15/40
U.S. Cl. 260—66        13 Claims

ABSTRACT OF THE DISCLOSURE

Novel polymers are disclosed which comprise modified olefins containing in their molecule an endomethylene ring or a cycloaliphatic ring, a straight hydrocarbon chain and characteristic polar groups including COOH, CN, CHO, $CONH_2$, $SO_3H$, $CH_2Cl$ and $COOR°$ where $R°$ may be an alkyl or an aryl radical. The new olefin polymers are obtained by a Diels-Alder reaction between olefin polymers containing conjugated double bonds with dienophyl reagents having at least one of the above-mentioned characteristic functional groups and to the mixes obtained thereby which can be cross-linked without sulfur.

The present invention refers to new polymers, to the process for obtaining same and to mixes curable without sulphur which contain said polymers. More particularly, it refers to new olefine polymers obtained by reacting olefine polymers containing conjugated double bonds with dienophyl reagents having characteristic functional groups and to the mixes obtained thereby which can be cross-linked without sulphur.

It is known that all the usual elastomers, containing some unsaturations and vulcanized by sulphur and accelerators containing recipes, may cause a more rapid aging of the final products with the following degrading of the properties of the macromolecule. Moreover, the presence of disulphuric or polysulphuric bridges causes the splitting of the side chains with following internal rearrangements of the molecules and then alterations of the physical and physical-chemical characteristics.

It has now surprisingly found a new class of olefine polymers which may give rise to without sulphur curable mixes so that products can be obtained having an improved resistance to the aging agents and a more stable molecular composition.

The modified olefine polymers, which are an object of action between olefine polymers having conjugated double bonds and dienophyl reagents introducing into the macromolecule characteristic functional polar groups, generally absent in the starting polyolefine chains.

More particularly, the process of the present invention refers to olefine polymers containing in their polymer chain one of the following groups:

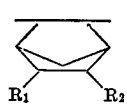

in which $R_1$ and $R_2$ are substituents different between themselves, one of them always being hydrogen and the other one being an alkadienyl radical as

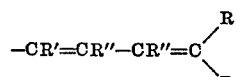

and

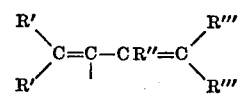

or alkenyl as

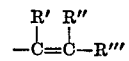

wherein the double bond is conjugated with a double bond present in the cycle, R always being an alkyl radical and R', R" and R''' being hydrogen, alkyl or aryl radicals; or it may have the general formula:

$$—(CH_2)_n—Z$$

$n$ ranging between 0 and 5 and Z being a cyclodiene radical selected from the following ones:

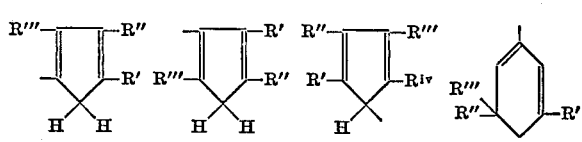

wherein R', R", R''' and $R^{IV}$ being hydrogen, alkyl or aryl radicals.

Moreover, it is possible to utilize the olefine polymers having one of the following groups in their polymer chain:

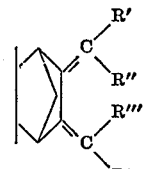

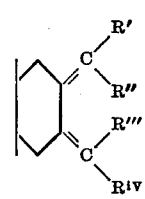

in which R', R", R''' and $R^{iv}$ may be hydrogen, alkyl or aryl radical or, as itself or two by two, may be divalent radicals able to give rise to a condensed ring.

Unrestrictive examples of olefine polymers usefully employable according to the invention are the terpolymers described and claimed by the same applicant in the Italian Pats. Nos. 843,706 and 851,691, which are U.S. Pats. Nos. 3,652,514 and 3,657,204, respectively, and in the Italian patent applications Nos. 19,653 A/70 and 19,657 A/70, which are U.S. applications Ser. No. 109,033 and 108,974, respectively; and in some other ones, based on the following termonomers:

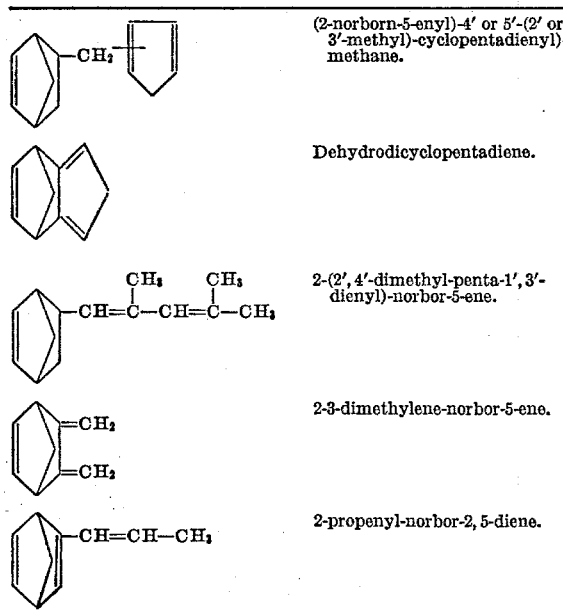

| | |
|---|---|
| | (2-norborn-5-enyl)-4' or 5'-(2' or 3'-methyl)-cyclopentadienyl)-methane. |
| | Dehydrodicyclopentadiene. |
| | 2-(2',4'-dimethyl-penta-1',3'-dienyl)-norbor-5-ene. |
| | 2-3-dimethylene-norbor-5-ene. |
| | 2-propenyl-norbor-2,5-diene. |

The modified olefine polymers are easily and cheaply available.

They are obtained by a Diels-Alder reaction between the aforesaid olefine polymers and suitable dienophyl reagents introducing into the macromolecules some characteristic polar groups.

Dienophyl reagents advantageously employed according to the present invention are the ethylene or acetylene derivatives mono- or poly-substituted by electron attracting compounds having one of he following formulas

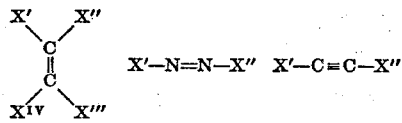

wherein X', X", X''' and X$^{iv}$ may be selected among H, —COOH, —COOR°, —CN, —CHO, —CONH$_2$, —SO$_3$H, —CH$_2$Cl, R° being an alkyl or an aryl radical, with the provision that they all cannot contemporaneously be hydrogen and, in the case of the carbon-carbon double bond, the cis-substituents may be divalent radicals able to interact in order to form a ring.

Unrestrictive examples of the usable dienophyl reagents are the following ones:

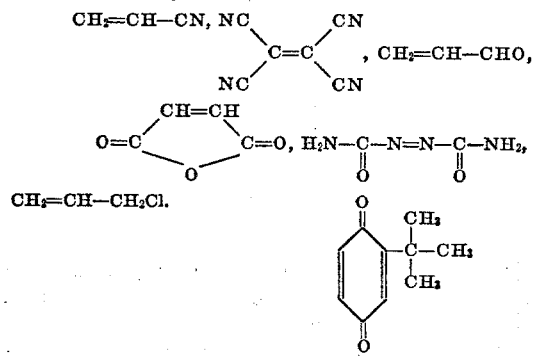

The polar groups which have to be introduced into the starting macromolecules give the dienophyl reagents, carrying these groups, a strong reactivity, so that it is possible to work at very mild reaction conditions.

According to the process of the present invention, the reaction is carried out at a temperature ranging from 0° to 150° C., preferably from 15° to 90° C., in hydrocarbon solutions of the olefine polymer, wherein the olefin polymer is present in the range from 0.1 to 5% on a basis of grams of polymer to cm.$^3$ of the hydrocarbon solution, the percentage of this latter ranging between 0.1 and 5%.

The reaction times depend from the dienophyl reactivity and from the employed temperature, however, they range between 2 and 50 hours. The mixes obtained by starting from the aforesaid olefine polymers, and constituting a second object of the present invention, are vulcanized by using the usual curing agents which do not contain any sulphur.

The so obtained product, as the starting modified olefine polymer, may be largely employed in the synthetic rubber field, which they point out the technical properties of, by given them new possibilities of reaction and improved capacities of adhesion and interaction, so that giving rise to manufactured articles having very good properties as a high mechanical resistance, a high resistance to abrasion and a decrease of the permanent set.

The invention is now illustrated by the following unrestrictive examples.

EXAMPLE 1

11 g. of a terpolymer containing ethylene (55% by weight), propylene (42%), dehydro-iso-dicyclopentadiene (3%) and having a toluenic intrinsic viscosity equal to 3.35 dl./g. at 30° C., obtained according to the Italian Pat. No. 843,706, U.S. Pat. No. 3,652,514, of the same applicant, were dissolved into 1.5 l. of toluene; 5 g. of maleic anhydride were added to it. The solution was stirred at room temperature for 8 hours, and then the polymer was coagulated by pouring the mixture into an excess of a methyl alcohol-acetone mixture (1:1). The polymer was purified again and again dissolving and coagulating it from n-hexane (four times), then dried under vacuum by heating at 50° C. The weight of the obtained product, having the aspect of uncured rubber, showed a quantitative yield with respect to the starting polymer. It had an intrinsic viscosity slightly different from the ones of the starting polymer (2.26 dl./g.) and, at U.V. examination, it is possible to note the total disappearance of the absorption at 236 m$\mu$ attributable to the system of the conjugated double bonds of the dehydro-iso-dicyclopentadiene. At the same time the I.R. spectrum of the modified terpolymer showed very strong absorptions, typical of the —CO—O—CO— group, at 1785 cm.$^{-1}$ (very strong) and at 1864 cm.$^{-1}$.

EXAMPLE 2

The aforesaid example was repeated by employing 20 g. of a terpolymer containing ethylene (55%), propylene (40%), dehydro-iso-dicyclopentadiene (5%) and having [$\eta$]=1.9 dl./g.; it was dissolved into 2 l. of toluene and added of 10 g. of maleic anhydride. The reaction suspension was stirred for 6 hours at 50° C.; then the polymer was recovered as aforesaid.

Also now the modified polymer did not show changes of the intrinsic viscosity, whereas the spectroscopic examination showed the total disappearance of the absorption at 236 m$\mu$ and the rise up of a strong band at 1785 cm.$^{-1}$ and of another light one at 1864 cm.$^{-1}$.

EXAMPLE 3

12 g. of a terpolymer containing ethylene (60%), propylene (34%) and methylcyclopentadienyl - norbornenyl-methane (6%), obtained according to the Italian Pat. No. 851,691, which is U.S. Pat. No. 3,657,204, and having [$\eta$]=2.1 dl./g., were dissolved into 700 cm.$^3$ of n-heptane, to which 15 cm.$^3$ of acrylonitrile were added. The solution was stirred for 24 hours at room temperature, then the modified polymer was recovered by employing the procedure of Example 1. In such a way a polymer was obtained having an elastomer aspect and $[\eta]=2.7$ dl./g.; at U.V. examination it still showed an absorption at 252 m$\mu$, attributable to the system of conjugated double bonds of the starting terpolymer. By referring the intensity of the registered band of the modified polymer to the intensity of the same band of the starting polymer, at the same dilution, 40% of the conjugated system of the methyl-cyclopentadienyl-norbornenyl-methane were calculated to be reacted with the employed dienophyl. The I.R. spectrum of a $CS_2$ film of the modified polymer showed the presence of a band at 2230 cm.$^{-1}$ due to the stretching of the C=N bond.

EXAMPLE 4

The preceding example was repeated by employing the same terpolymer, having a methylcyclopentadienyl-norbornenyl-methane content equal to 45% b.w.; it was dissolved into 700 cm.$^3$ of n-heptane with 15 cm.$^3$ of acrolein. After 24 hours of reaction at room temperature, the modified polymer was coagulated and again dissolved according to the procedure of Example 1. After drying, an elastomer was obtained having the same molecular weight (MW) of the starting polymer, but the U.V. absorption at 252 m$\mu$ was very strongly lowered. It was calculated, as said in Example 3, that 83% of the termonomer had reacted by its system of conjugated double bonds. The I.R. spectrum of a sample of the modified polymer showed a very strong band at 1720 cm.$^{-1}$ ($\nu$ C=C) attributable to the carbonyl group of the reacted dienophyl.

EXAMPLE 5

Use was made of a terpolymer consisting of ethylene (60% b.w.), propylene, (37%) and 2,3-dimethylene-norbor-5-ene (3%), obtained according to the Italian patent application 19,657 A/70, which is U.S. applic. Ser. No. 108,974, of the same applicant and having $[\eta]=1.6$ dl./g. A Diels-Alder reaction between it and methyl-vinyl ketone was carried out in toluene (1.5 l. for 11 g. of polymers) at 50 C. for 6 hours. According to Example 1, an elastomer was recovered showing $[\eta]=1.75$ dl./g. and, at U.V. examination, the nearly total disappearance and of the absorption at 227 m$\mu$ typical of the conjugated dimethylene system of the employed terpolymer.

At I.R. examination a strong absorption of 1718 cm.$^{-1}$ resulted, it being typical of the carbonyl group of saturated ketones.

EXAMPLE 6

Use was made of a terpolymer consisting of ethylene, propylene and 11% b.w. of 2-(2',4'-dimethyl-penta-1',3'-dienyl)-norbor-5-ene and obtained according to the Italian patent application No. 19,653 A/70, which is U.S. applic. Ser. No. 109,033, of the same applicant, in order to carry out a Diels-Alder condensation with t-butyl-quinone. The reaction was carried out in toluene at 70° C. for 15 hours. The recovered polymer still had an elastomer character and showed, at U.V. examination, the total disappearance of the absorption at 234 m$\mu$ typical of the termonomer of the starting polymer. At the same time the I.R. spectrum of the recovered product showed the presence of a strong band at 1667 cm.$^{-1}$, in the typical range of the conjugated carbonyl groups.

EXAMPLE 7

11 g. of the terpolymer of Example 4 were dissolved into 1.5 l. of toluene and added with 10 cm.$^3$ of ethyl-propiolate in order to carry out a Diels-Alder reaction between the diene system of the macromolecules and the acetylene dienophyl.

After 8 hours of reaction at 60° C. a modified polymer was recovered showing, at U.V. examination, the disappearance of the absorption at 232 m$\mu$, awardable to the system of conjugated double bonds of the starting terpolymers, whereas the I.R. examination pointed out the presence of ester groups at 1712 cm.$^{-1}$, typical bond of the absorption of the unsaturated ester.

EXAMPLE 8

The preceding example was repeated by employing as dienophyl (in excess) the commercial product Celogen-AZ (azodicarboxyamide). The reaction was carried out at 90° C. in toluene for 24 hours.

EXAMPLE 9

The ethylene-propylene-dehydrodicyclopentadiene terpolymer, containing a triene percentage of 3%, obtained according to the Italian patent application No. 843,706, U.S. Pat. No. 3,652,514, and modified as above said by adding maleic anhydride, was used for preparing in an opened mixer four mixes having the recipe of Table I, and then was cured at 153° C. in a press at varying times.

The properties at traction of the cured products, reported on Table II, were obtained at Inston dynamometer, at a traction rate of 200 mm./min., according to the ASTM rules D–417 and by employing the Din C hollow punch.

TABLE I

|  | I | II | III | IV |
|---|---|---|---|---|
| Polymer | | | 100 | |
| HAF | | | 50 | |
| Zn oxide | | 5 | | |
| Zn diethyldithiocarbamate | | 0.5 | | |
| NaOH | | 0.5 | 0.5 | |
| Esamethylenetetramine | | | 1 | |
| Ethyl glycol | | | | 5 |

TABLE II

| Properties | I | II | | | III | | | IV | | |
|---|---|---|---|---|---|---|---|---|---|---|
| | 180 min. | 30 min. | 90 min. | 180 min. | 30 min. | 90 min. | 180 min. | 30 min. | 90 min. | 180 min. |
| M 100% (kg./cm.$^2$) | 13.5 | 24.5 | 26.5 | 29.5 | 23.0 | 25.0 | 25.0 | 27.0 | 32.0 | 33.5 |
| M 200% (kg./cm.$^2$) | 15.5 | 49.0 | 53.5 | 63.0 | 45.0 | 49.5 | 48.0 | 38.5 | 50.5 | 56.0 |
| M 300% (kg./cm.$^2$) | 15.5 | 76.0 | 83.0 | | 69.5 | 75.5 | 75.5 | | 66.0 | 75.0 |
| C.R. (kg./cm.$^2$) | 15 | 96.5 | 28.5 | 84.0 | 88.0 | 82.0 | 93.0 | 43.0 | 67.0 | 75.5 |
| A.R. percent | 270 | 415 | 375 | 275 | 390 | 345 | 410 | 280 | 330 | 325 |
| Perm. set. percent | 7 | 13 | 13 | 8 | 11 | 13 | 13 | 13 | 13 | 13 |

EXAMPLE 10

The ethylene-propylene-dehydrodicyclopentadiene terpolymer, with a triene content equal to 5.3% and $[\eta]=2.26$ dl./g., obtained according to the Italian Pat. No. 843,706, U.S. Pat. No. 3,652,514, and modified as aforesaid by adding maleic anhydride, was utilized in order to prepare in an opened mixer four mixes having the recipe of Table I; the vulcanization was carried out in a press at 153° C., at varying times.

The properties at traction of the cured product are reported on Table II.

TABLE III

| Properties | I | II | | | III | | | IV | | |
|---|---|---|---|---|---|---|---|---|---|---|
| | 180 min. | 30 min. | 90 min. | 180 min. | 30 min. | 90 min. | 180 min. | 30 min. | 90 min. | 180 min. |
| M 100% (kg./cm.$^2$) | 17.5 | 32.5 | 28.0 | 41.0 | 38.0 | 40.5 | 44.0 | 17.5 | 25.5 | 23.0 |
| M 200% (kg./cm.$^2$) | 23.0 | 68.0 | 90.0 | 100.0 | 73.5 | 37.5 | 89.0 | 31.0 | 44.3 | 49.0 |
| M 300% (kg./cm.$^2$) | | | 99.0 | | 109.0 | 134.0 | | 44.5 | 63.5 | 81.5 |
| C.R. (kg./cm.$^2$) | 23.0 | 104.0 | 128.0 | 132.0 | 118.0 | 146.0 | 137.0 | 46.0 | 68.0 | 93.0 |
| A.R. percent | 240 | 335 | 280 | 255 | 335 | 335 | 285 | 330 | 335 | 343 |
| Perm. set. percent | 17 | 8 | 4 | 4 | 6 | 5 | 4 | 13 | 8 | 8 |

EXAMPLE 11

The ethylene-propylene-(methylcyclopentadienyl-nor-bornenylmethane), with a triene content equal to 4% and an intrinsic viscosity $[\eta]=1.59$ dl./g., obtained according to the Italian Pat. No. 851,691, which is U.S. Pat. No. 3,657,204, and modified by an adding of maleic anhydride, was utilized to prepare in an opened mixer four mixes having the recipes of Table I, which were cured in press at 153° C. at varying times, and then tractionated at the Instram dinanometer with a traction rate equal to 200 mm./min.

The results of the traction test are reported on Table IV.

(3) 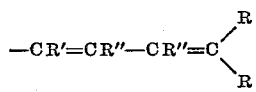

(4) 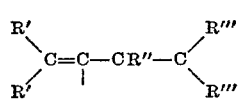

TABLE IV

| Properties | I | | | II | | | III | | | IV | | |
|---|---|---|---|---|---|---|---|---|---|---|---|---|
| | 30 min. | 90 min. | 180 min. | 30 min. | 90 min. | 180 min. | 30 min. | 90 min. | 180 min. | 30 min. | 90 min. | 180 min. |
| M 100% (kg./cm.²) | 15.5 | 19.5 | 19.0 | 32.0 | 35.0 | 45.0 | 39.0 | 39.5 | 48.5 | 20.0 | 21.0 | 23.0 |
| M 200% (kg./cm.²) | 21.0 | 24.0 | 26.0 | 59.0 | 75.0 | 107.0 | 107.5 | 122.0 | 141.0 | 37.0 | 42.0 | 52.5 |
| M 300% (kg./cm.²) | 22.5 | | | | 119.0 | 178.0 | | | | 60.9 | 72.0 | 96.0 |
| C.R. (kg./cm.²) | 23.0 | 24.0 | 27.0 | 59.5 | 130.0 | 179.0 | 183.5 | 184 | 193.0 | 76.5 | 92.5 | 130.0 |
| A.R. percent | 310 | 220 | 235 | 225 | 335 | 300 | 285 | 255 | 240 | 415 | 395 | 385 |
| Perm. set. percent | 45 | 19 | 14 | 6 | 13 | 8 | 8 | 6 | 4 | 27 | 23 | 17 |

EXAMPLE 12

Some tests of adhesion on sheet-aluminum were carried on the series of the hereinafter reported polymers.

The used polymers are: a terpolymer (A) consisting of ethylene-propylene-dehydrodicyclopentadiene with a triene content of 3% and $[\eta]=3.2$ dl./g. obtained according to the Italian Pat. No. 843,706, U.S. Pat. No. 3,652,514; a terpolymer (B) equal to A but modified by maleic anhydride as aforesaid; a terpolymer (C) consisting of ethylene-propylene-dehydrodicyclopentadiene with a triene content of 5.3% $e[\eta]=2.26$ dl./g. and modified as aforesaid; a terpolymer (D) consisting of ethylene-propylene-methylcyclopentadienylnorbornenylmethane was a trient content equal to 4% $\alpha[\eta]=1.2$ dl./g., obtained according to the Italian Pat. No. 851,691; a terpolymer as the preceding one but modified by maleic anhydride.

The polymers were pressed at 145° C. for 20 minutes, in press with a 60 kg./cm.² pressure, between two aluminum sheets having an 0.1 mm. thickness; the average load necessary to separate the sheets was calculated by means of an Instram dinamometer at a traction rate of 50 mm./min.

The break away average load are reported on Table V.

TABLE V
[Polymer adhesion test—metal (on aluminium sheets—145° C., 20 min. in press-pressure—60 kg./cm.²)]

| | A | B | C | | D | |
|---|---|---|---|---|---|---|
| | EBN EPSYN 55 | (DHDCP) R N269 | (DHDCP+AM) RN 229 | (DHDCP+AM) RN 307 | (DA30+AM) RN 334 | (DA30) RN 306 |
| Breakaway load (kg./cm.) | 0.483 | 0.333 | 0.566 | 1.00 | 0.60 | 0.15 |

What we claim is:

1. The Diels-Alder modified olefine polymer produced by reacting in a hydrocarbon solution and at a temperature ranging between 0° and 150° C.;

(A) an olefine terpolymer consisting of ethylene, propylene and a compound having conjugated double bonds according to one of the following general formulas:

(1) 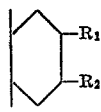

(2) 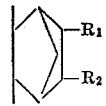

in which $R_1$ and $R_2$ are substitutents different between themselves, one of them always being hydrogen and the other one selected from (a) alkadienyl radicals according to the formulas $$-CR'=CR''-CR''=C\diagup^{R}_{\diagdown R}$$

and $$\diagup^{R'}_{R'}C=C-CR''-C\diagup^{R'''}_{\diagdown R'''}$$

(b) an alkenyl radical of the formula $$-\overset{R'}{\underset{C}{|}}=\overset{R''}{\underset{C}{|}}-R'''$$

wherein the double bond of the alkenyl radical is conjugated with a double bond present in the ring, and (c) a radical of the formula $$-(CH_2)n-Z$$

in which $n$ is a number ranging between 0 and 5 and Z is a cyclodiene radical selected from the following formulas:

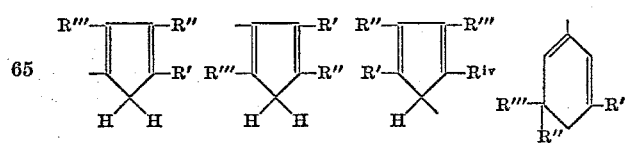

and wherein in all the above formulas R is an alkyl radical and R', R'', R''' and $R^{iv}$ may be hydrogen, alkyl or aryl radicals, or may be divalent radicals able to give rise to a condensed ring; with (B) a dienophyl reagent selected from the group consisting of

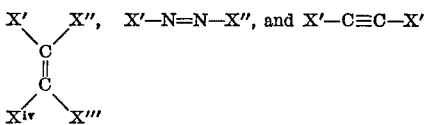

in which X', X'', X''' and X^iv are selected from H, COOH, COOR°, CN, CHO, CONH$_2$, SO$_3$H, and CH$_2$Cl, R° being an alkyl or an aryl radical, with the provisions that they all cannot contemporaneously be hydrogen and, in the case of the carbon-carbon double bond, the cis-substituents may be divalent radicals, able to interact in order to form a ring.

2. The modified olefine polymer according to claim 1 wherein the reaction is carried out at a temperature ranging between 15° and 90° C.

3. The modified olefine polymer according to claim 1 wherein the hydrocarbon solvent is selected from the group consisting of toluene and n-heptane.

4. The modified olefine polymer according to claim 1 wherein the reaction is carried out in a hydrocarbon solution wherein the olefine polymer is present in the range from 0.1 to 5% on a basis of grams of polymer to cm.$^3$ of the hydrocarbon solution.

5. The Diels-Alder modified olefine polymer produced by reacting in a hydrocarbon solution at a temperature ranging between 0° and 150° C., an olefine terpolymer containing ethylene, propylene and a termonomer selected from the group consisting of dehydro-isodicyclopentadiene, methylcyclopentadienyl-norbornenylmethane, 2,3-dimethylene-norbor-5-ene, 2-(2',4'-dimethyl-penta-1',3'-dienyl) norbor-5-ene, 2-propenyl-norbor-2,5-diene, (2-norborn-5-enyl)-4' or 5'-(2' or 3-methyl)-cyclopentadienyl-methane with a dienophyl selected from the group consisting of maleic anhydride, acrylonitrile, acrolein, methyl-vinyl ketone, t-butyl-quinone, ethyl-propiolate and azodicarboxyamide.

6. The Diels-Alder modified olefine polymer according to claim 5 wherein said termonomer is dehydro-isodicyclopentadiene and said dienophyl is maleic anhydride.

7. The Diels-Alder modified olefine polymer according to claim 5 wherein said termonomer is methylcyclopentadienyl-norbornenyl-methane and said dienophyl is acrylonitrile.

8. The Diels-Alder modified olefine polymer according to claim 5 wherein said termonomer is methylcyclopentadienyl-norbornenyl-methane and said dienophyl is acrolein.

9. The Diels-Alder modified olefine polymer according to claim 5 wherein said termonomer is 2,3-dimethylene-norbor-5-ene and said dienophyl is methyl-vinyl ketone.

10. The Diels-Alder modified olefine polymer according to claim 5 wherein said termonomer is 2-(2',4'-dimethyl-penta-1',3'-dienyl)-norbor-5-ene and said dienophyl is t-butyl-quinone.

11. The Diels-Alder modified olefine polymer according to claim 5 wherein said termonomer is methylcyclopentadienyl-norbornenyl-methane and said dienophyl is ethyl-propiolate.

12. The Diels-Alder modified olefine polymer according to claim 5 wherein said termonomer is methylcyclopentadienyl-norbornenyl-methane and said dienophyl is azodicarboxyamide.

13. A cured olefine polymer, comprising the product as defined in claim 5 further cured in a press without sulphur curing agents.

References Cited

UNITED STATES PATENTS

| | | | |
|---|---|---|---|
| 3,271,477 | 9/1966 | Kresge | 260—877 |
| 3,408,424 | 10/1968 | Barkhuff | 260—878 |
| 3,418,299 | 12/1968 | Benedikter et al. | 260—85.3 |
| 3,444,149 | 5/1969 | Kelly | 260—80.78 |
| 3,448,174 | 6/1969 | Loveless et al. | 260—878 |
| 3,483,273 | 12/1969 | Prugnall et al. | 260—878 |
| 3,524,826 | 8/1970 | Kresge et al. | 260—5 |
| 3,534,005 | 10/1970 | Nudenberg et al. | 260—79 |

OTHER REFERENCES

Fieser & Fieser, Advanced Organic Chemistry, pp. 206–210 (1961).

STANFORD M. LEVIN, Primary Examiner

U.S. Cl. X.R.

260—73 R, 78.5 R, 79.5 NV, 80.7, 80.78

UNITED STATES PATENT OFFICE
CERTIFICATE OF CORRECTION

Patent No. 3,803,092            Dated April 9, 1974

Inventor(s) Sebastiano Cesca, Sergio Arrighetti, Arnaldo Roggero and Giuseppe Ghetti It is certified that error appears in the above-identified patent and that said Letters Patent are hereby corrected as shown below:

Column 1, between lines 51 and 52, insert -- the present invention, are obtained by a Diels-Alder re- --

Column 3, line 40, "he" should read -- the --

Column 4, line 36, "purified again" should read -- purified by again --

Column 5, line 38, "50 C." should read -- 50°C. --

Column 6, line 13, "awardable" should read -- attributable --

Column 6, line 34, "Inston" should read -- Instron --

Column 7, line 11, "Instram" should read -- Instron --; "dinanometer" should read -- dinamometer --

Column 7, line 39, "was a trient" should read -- with a triene --

Column 7, line 47, "Instram" should read -- Instron --

Column 9, line 35, "3-methyl" should read -- 3'-methyl --

Signed and sealed this 5th day of November 1974.

(SEAL)
Attest:

McCOY M. GIBSON JR.
Attesting Officer

C. MARSHALL DANN
Commissioner of Patents